July 24, 1951     C. E. MONGAN, JR., ET AL     2,561,529
APPARATUS FOR HANDLING AND TEMPERING GLASSWARE
Filed Aug. 10, 1942     7 Sheets-Sheet 1

Inventors
Charles E. Mongan, Jr.
Donald W. Mueller
by Brown & Parham
Attorneys

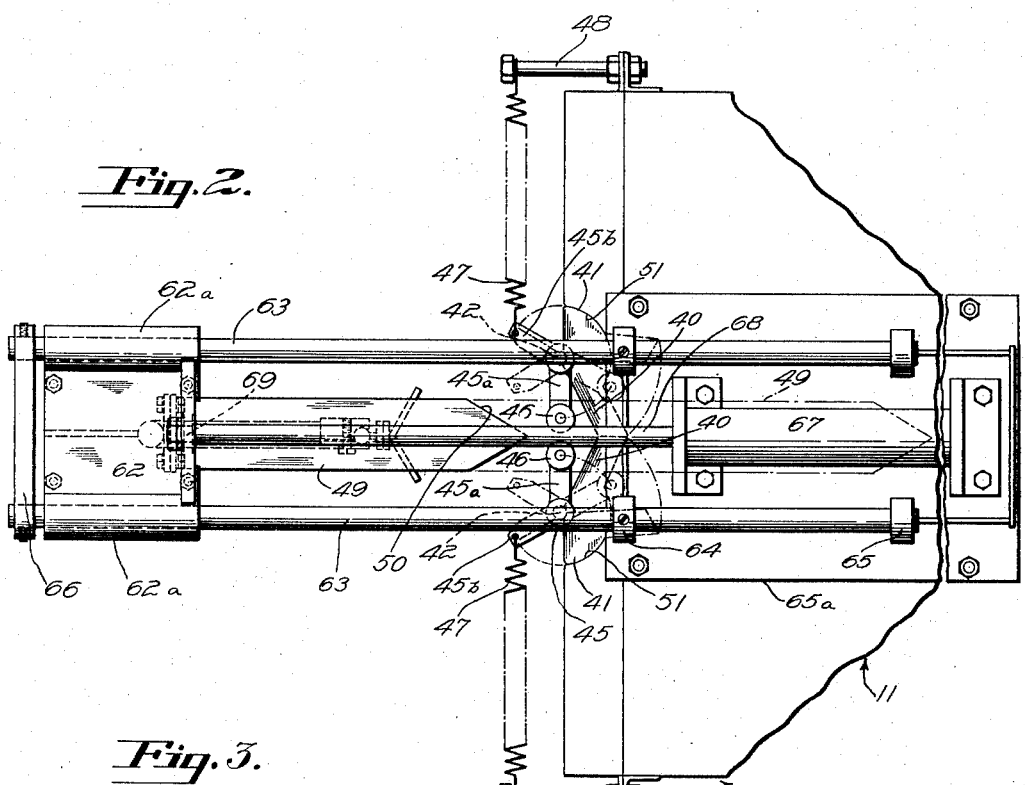

July 24, 1951  C. E. MONGAN, JR., ET AL  2,561,529
APPARATUS FOR HANDLING AND TEMPERING GLASSWARE
Filed Aug. 10, 1942  7 Sheets-Sheet 3

Patented July 24, 1951

2,561,529

UNITED STATES PATENT OFFICE 2,561,529

APPARATUS FOR HANDLING AND TEMPERING GLASSWARE

Charles E. Mongan, Jr., Hartford, and Donald W. Mueller, West Hartford, Conn., assignors to Emhart Manufacturing Company, a corporation of Delaware Application August 10, 1942, Serial No. 454,248

20 Claims. (Cl. 49—47)

This application relates to improvements in means for handling and heat treating glassware, particularly glassware as it comes from a forming machine so that such glassware, when cool, will have the requisite strength for the purposes for which the ware is intended.

It is usual to apply a heat treatment to newly made glassware by the use of annealing apparatus or lehrs. In annealing, the glassware is brought to a temperature well above its strain point, at which stresses in the glass are relieved, and then is cooled down slowly and as uniformly as possible to a temperature below such strain point, after which the further cooling of the glassware to room temperature or a temperature at which the glassware can be handled may be more rapid. The aim of annealing, generally stated, is to effect removal and prevention of all permanent internal stresses and strains in the walls of the glassware and also to prevent the creation of temporary strains of sufficient magnitude to cause breakage of the article during cooling. Annealing of glassware takes considerable time and requires the use of factory space of considerable area for the annealing structure and equipment required. Automatic apparatus for handling and annealing glassware are in wide-spread use.

It is known that the strength of glassware and its resistance to shocks, jars and other possible service hazards may be improved by heat treating the glassware to temper it. In tempering, the glassware is brought to a condition of approximate thermal uniformity at a temperature well above its strain point for the relief of strains as in annealing. The glassware then is cooled rapidly at its surfaces to a temperature below the strain point to place the surface layers of the walls of each article of glassware under compression and the intermediate glass between such surface layers under tension. So far as we are aware, there has not been prior to our invention any automatic apparatus in commercial use for taking the output of a glassware forming machine and handling and tempering such glassware as a connected or cooperating part of the production of formed and heat treated glassware.

An object of the present invention is to provide an efficient, practical and reliable automatic apparatus for receiving newly made glassware as produced by a forming machine and for handling and treating such glassware so as to effect tempering thereof.

A further object of the invention is to provide an improved apparatus for handling and heat treating newly made glassware so that cool glassware that is stronger and tougher than annealed glassware can be produced in less time, by the use of less factory space and equipment, and more economically than would be the case if annealing of such glassware were required.

A further object of the invention is the provision in an apparatus of the character described of cooperative mechanisms for heating or equalizing the temperature of glassware produced by an associate forming machine so as to bring such glassware to a predetermined temperature above the strain point of the glass thereof and for thereafter applying cooling fluid to the inner and outer surfaces of each such article of glassware rapidly to cool the glassware to a temperature below such strain point and for coordinating the operations of such heating or temperature equalizing means and the glassware cooling means with each other and in relation to the glassware producing operations of the associate forming machine.

A further object of the invention is the provision in a glassware handling and treating apparatus of the character described of safety provisions for preventing premature or untimely operations of movable operating parts of the apparatus.

A further object of the invention is the provision of an automatic glassware handling and treating apparatus having adjustments for adapting the apparatus for use at different times with articles of glassware of different sizes and shapes and descriptions.

Other objects and advantages of the invention hereinafter will be pointed out or will become apparent from the following description of an illustrative glassware handling and treating apparatus embodying the invention, as shown in the accompanying drawings, in which:

Figure 1 is a longitudinal vertical section of a glassware heating or temperature equalizing structure or oven portion of the apparatus, the view also showing, mainly in elevation, a mechanism for transferring glassware from a dead plate of an associate forming machine to the oven, and some of the elements of the mechanism for removing the glassware from the oven, for applying cooling fluid to the surfaces thereof, and for placing the cooled glassware on a delivery conveyor, all at proper times in the cycle of operations of the complete apparatus;

Fig. 2 is a plan view in relatively enlarged form of mechanism of the apparatus for opening a pair of inwardly opening pivoted doors of the oven and for pushing articles of glassware into the thus opened intake end of the oven.

Fig. 3 is a side elevation of the structure shown in Fig. 2;

Figure 6:
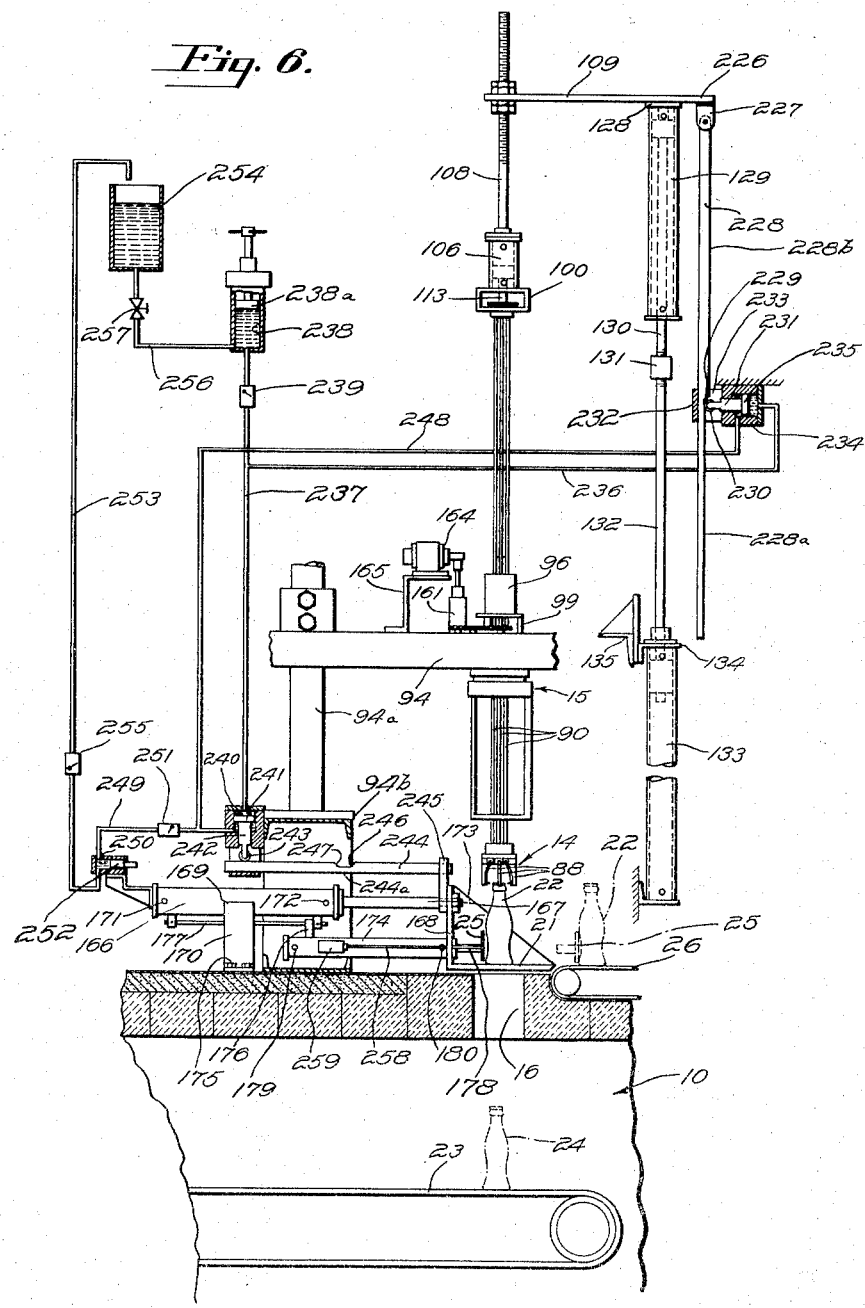
Figure 7:
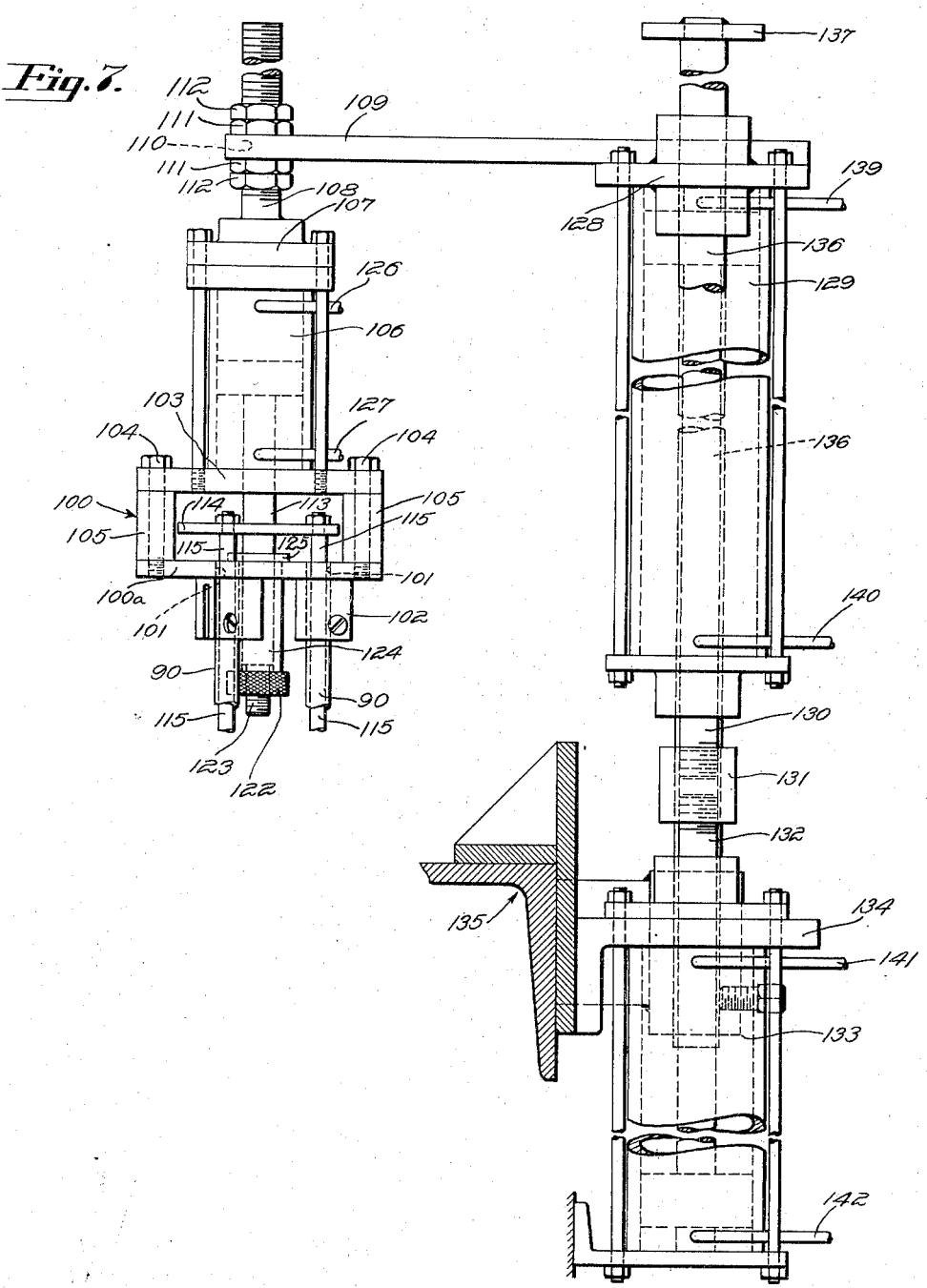
Figure 8:
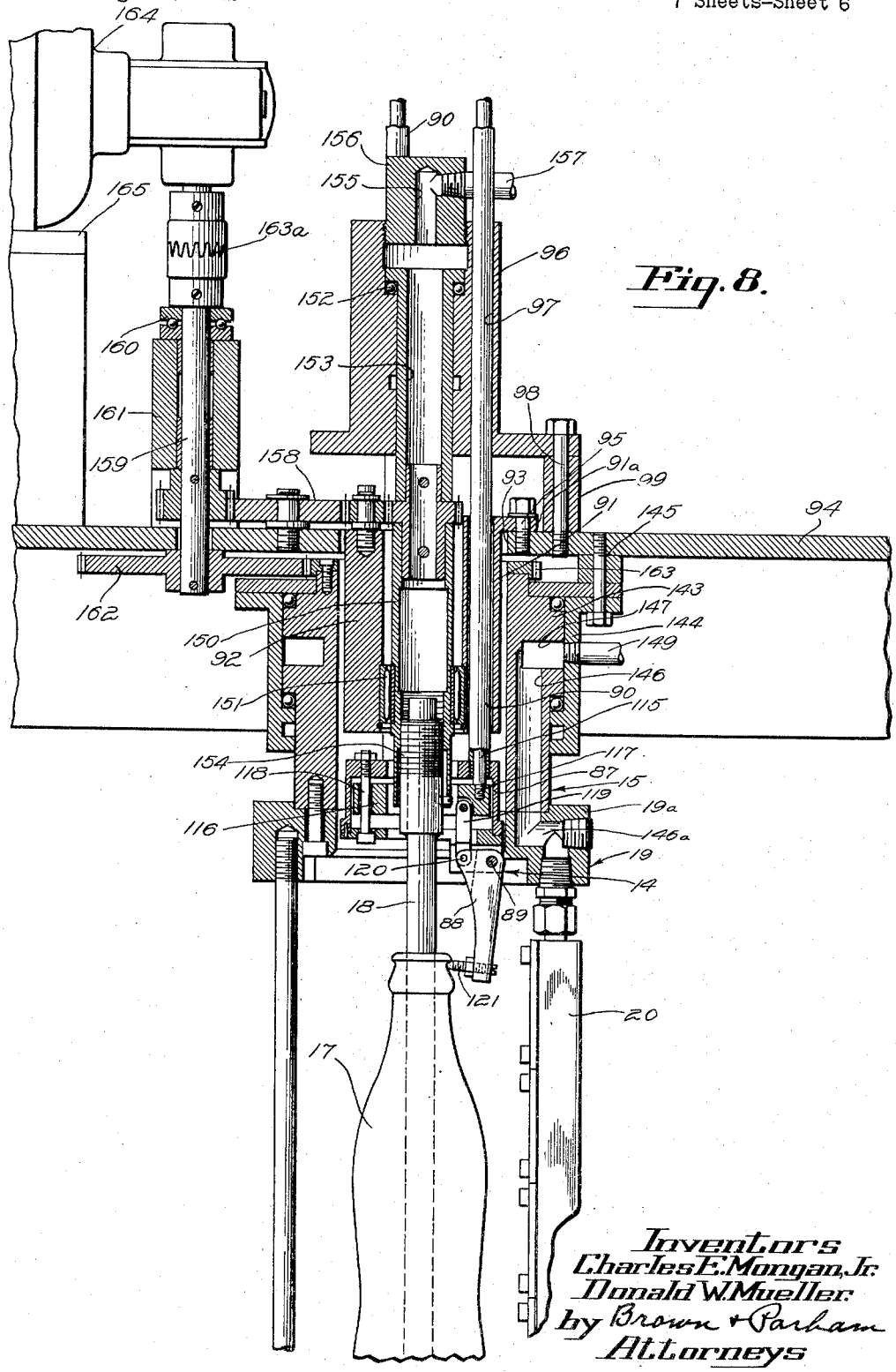
Figure 9:
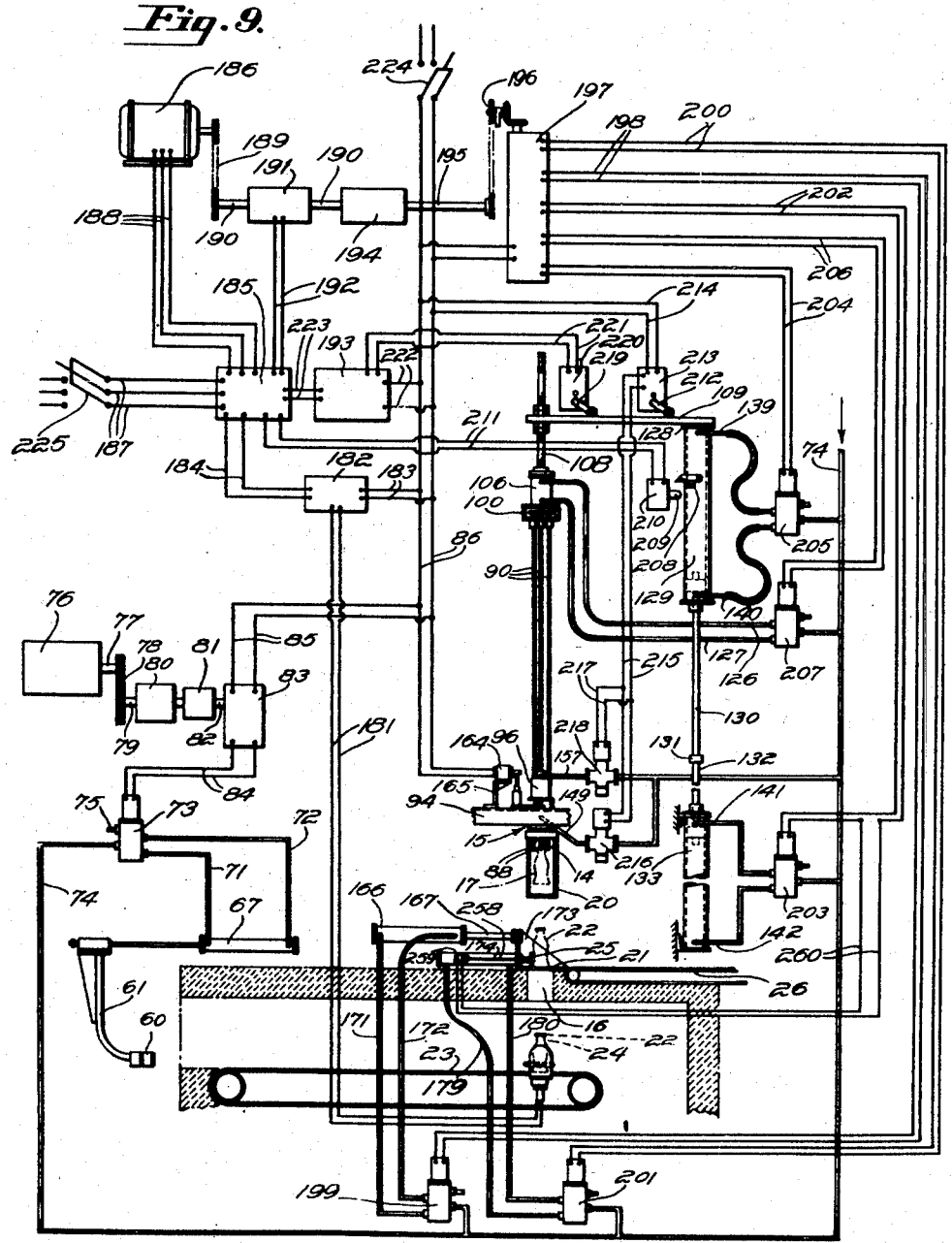

Fig. 6 is a view, mainly in elevation and partly in section, showing part of the glassware heating or temperature equalizing structure or oven together with elements of the mechanism for removing articles of glassware from the oven, for cooling them and for thereafter placing them on a delivery conveyor and a safety device for preventing untimely operating movements of movable parts of such mechanism;

Fig. 7 is a view, mainly in elevation with a stationary frame part in section, showing an assembly of connected operating and other parts of the mechanism for raising and lowering articles of glassware during a glassware tempering operation;

Fig. 8 is a view, mainly in vertical section, of the supporting frame structure of the tempering mechanism and of the parts of such mechanism for supporting an article of glassware in a relatively elevated position for cooling and for blowing cooling fluid against both the internal and the external surfaces of such articles; and Fig. 9 is a diagram of the principal operating parts of the complete automatic glassware handling and tempering apparatus together with the pneumatic and electrical devices by which the operations of such parts are regulably controlled and timed or coordinated, each with the others.

Figure 1:
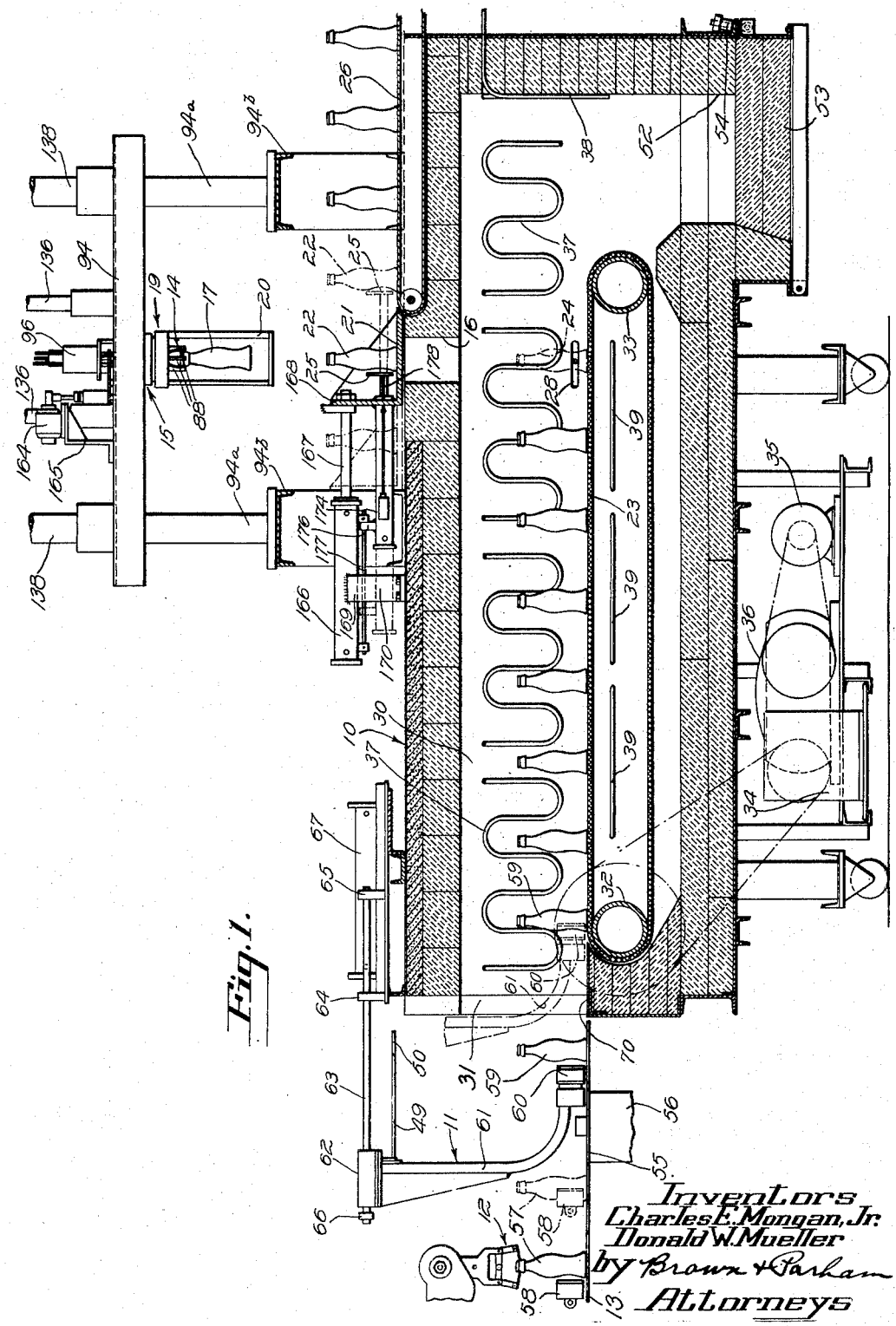

The illustrative apparatus shown in the drawings includes a glassware heating or temperature equalizing structure or oven, generally designated 10 and best seen in Fig. 1, to which each newly formed article of glassware produced by an associate forming machine is transferred by an oven-loading transfer mechanism, generally indicated at 11. Each such article has been delivered by a take-out mechanism 12 of the forming machine, which is not shown, to a delivery station, as to the position occupied by such article when it stands upon a dead plate 13 of the forming machine.

After a brief period of time in the oven 10, during which the article of glassware may be heated, if required, the article is removed from the oven by vertically movable tongs 14 of an article cooling or tempering mechanism which is generally designated 15 in Figs. 1, 6, 8 and 9 of the drawings. This tempering mechanism, the details of which will hereinafter be more particularly described, will act automatically to raise the article of glassware from the oven through a takeout opening 16 in the top wall of the oven structure, Figs. 1, 5 and 6, to a cooling position at a level above the oven, as to the position at which the glass bottle 17 is supported in Figs. 1, 8 and 9 of the drawings. At this position, the glass bottle 17 may be cooled rapidly by cooling air or other gaseous fluid blown against its inner surface by the internal cooling nozzle 18, and against its outer surface from an outer blowing frame 19 which includes a series of vertically disposed external nozzles or air cooling fluid applicators 20 arranged in a circle around the bottle.

After the bottle has been thus cooled from the selected higher temperature to a temperature below its strain point to set up the desired conditions of compressive stresses in the inner and outer surface layers of the glass wall of the bottle and tension in the glass intermediate such surface layers, the tempering mechanism will function to lower the tempered article onto a combined article rest plate and slidable closure 21 for the take-out opening 16 in the top wall of the oven. See Figs. 1, 6 and 9 in which an article designated 22 is shown standing upon the plate 21, the latter being in position to close the oven takeout opening 16.

By mechanism hereinafter to be described, the member 21 may be retracted to allow the tongs of the tempering mechanism to be lowered through the opening 16 to pick up an article from its take-out position on the delivery end portion of a conveyor 23 within the oven and thereafter to raise such articles through the oven takeout opening 16 to the article cooling position hereinbefore referred to. In Figs. 1, 6 and 9 a bottle indicated at 24 is in the take-out position on the delivery end portion of the conveyor 23 where it may be gripped by the tongs of the tempering mechanism and removed from the oven for the tempering operation.

After the upwardly moving tongs of the tempering mechanism and the glass article supported thereby have cleared the oven takeout opening, the member 21 is returned to its closed position, as shown in Figs. 1, 6 and 9, and the article 22 that has been resting thereon is shoved therefrom by the delivery pusher 25, Figs. 1, 6 and 9, onto a tempered article delivery conveyor 26. This is accomplished by a forward projection of the pusher 25 from its full line position to the position shown in dot-and-dash lines in Figs. 1 and 6. The delivery pusher 25 is thereafter retracted to the position shown in full lines in Figs. 1, 6 and 9 so as to permit the next article of glassware, which is in the meantime being tempered at the overhead cooling station, to be deposited onto the member 21.

The operations of the oven loading transfer mechanism 11 to introduce articles of glassware into the oven may be timed to occur in coordination with the operations of the article takeout device 12 of the associate glassware forming machine, as hereinafter will be more fully explained. Each article transferred by the mechanism 11 to the conveyor 23 in the oven may be moved by the conveyor 23 until such article reaches the take-out position occupied by the article 24 in Figs. 1, 4, 5, 6 and 9. At this position, the article will interrupt the passage of light from an electric lamp 27 through aligned slits 28 in the side walls of the oven structure to a photo-electric device 29. See Figs. 4 and 5. The resultant energization of the photo-electric device 29 will render the latter effective through electrical connections and connected operating mechanisms, hereinafter to be pointed out, to initiate a chain or series of operations of the tempering mechanism, the oven takeout opening closure and the tempered article delivery pusher, substantially as hereinbefore described.

The several components of the illustrative apparatus will now be described in greater detail.

The glassware heating or temperature equalizing structure or oven

The structure 10, best shown in Fig. 1, may be of box-like form, the walls thereof being made of suitable refractory or other heat resistant material or materials, backed by heat insulation at any place or places desired and supported at the position required in any suitable known manner. The walls of the structure 10 are formed to define therewithin a heating or temperature equalizing chamber 30. The chamber 30 may have an article intake or loading opening 31 at the end of the structure 10 next to the forming machine through which the transfer mechanism 11 may move each of a series of glass articles produced by the forming machine onto the receiving end portion of the conveyor 23. The conveyor 23 may comprise an endless belt of suitable material mounted within the chamber 30 on a pair of horizontally spaced transverse rollers or drums 32 and 33. One of these, as the drum 32, may be driven by suitable driving connections, indicated generally at 34, with a motor 35. The conveyor belt driving means is shown more or less diagrammatically but it will be understood that it may include an adjustable speed change device, indicated at 36, and/or other known adjustments so that the ware moving speed of the upper stretch of the conveyor 23 in the chamber 30 from the direction of the intake end of the chamber toward the opposite end thereof may be regulated to control the time required for movement of a bottle or other article of glassware within the chamber from the time such bottle is placed on the conveyor 23 until it reaches the take-out position occupied by the bottle 24 in Fig. 1.

Heating means may be provided to apply the desired amount of heat to the articles on the conveyor 23 so that each such article will be at the temperature desired when it reaches the take-out position. While the newly made articles of glassware produced by the forming machine will retain considerable heat incident to their manufacture and portions of at least some kinds of articles may have temperatures above the strain point and even above the upper tempering temperature desired, it ordinarily will be necessary to apply some heat to the articles in the oven 10 in order to assure the desired uniformity of temperature throughout all portions of each article. This is particularly true in the case of bottles and other hollow glass articles which may vary at different portions in the thickness, diameter or transverse dimensions, configuration, etc., of the wall thereof. If, however, circumstances will permit, the oven 10 may be used to effect equalization of the temperature of the glass article by permitting the residual heat of the wall of such article to distribute itself throughout the entire wall of such article while the article is being moved within the protected and heat insulated oven chamber. The heating elements may be operatively connected with any suitable known electrical connections (not shown) for supplying electric current thereto.

As shown, the chamber 30 may be provided with electrical heating elements 37 extending along the side walls thereof. Other electrical heating elements, as at 38, may be provided on the wall of the chamber at the closed rearward end thereof and still other electrical heating elements, as at 39, may be located at the sides of the chamber 30 at a level between those of the upper and lower stretches of the conveyor 23.

The intake opening 31 at the end of the chamber 30 next to the forming machine, which may be termed the front end of the oven, may be closed by a pair of doors 40, Figs. 2 and 3, having sector shaped hub portions 41 mounted upon vertical shafts 42. The vertical shafts 42 are journaled in aligned bearings in upper and lower brackets 43 and 44, carried by the oven structure. Bell crank levers 45 are mounted on upper end portions of the shafts 42 and comprise inwardly extending arms 45a carrying rollers 46 and outwardly extending arms 45b. Tension coil springs 47 connect the arms 45b with anchorage pins 48 at the opposite sides of the oven structure and exert torsion on the shafts 42 so as to tend to keep the doors 40 closed. A door opening device comprises a horizontal bar 49 having a wedge shaped end portion 50 adapted to be inserted between the rollers 46 when the bar is moved rectilinearly from its full line position to the dot-and-dash line position shown in Fig. 2. The rollers are thus moved apart, as to the dot-and-dash line positions shown in Fig. 2, the bell crank levers being actuated to open the doors 40 in inward directions so as to clear the intake opening 31 of the chamber 30 to permit an article of glassware to be moved into such chamber. The door opener 49 is carried by a moving part of the article loading transfer mechanism 11, presently to be described. The convex curvature of the outer lateral surfaces of hubs 41 of the doors permits continuous close and practically air-tight contact of these surfaces with the suitably configured recesses 51 in the side walls of the oven structure in which the hub portions of the doors are mounted. The doors and their hubs may be made of sheet metal so as to be hollow and therefore relatively light in weight. Insulation, not shown, may be used to fill the spaces within the doors.

The oven 10 may be provided with a bottom opening 52 in advance of the conveyor 23 for the removal of any broken or other glassware that has not been removed through the top opening 16. The opening 52 is normally closed by a hinged closure 53, which may be held shut by a suitable latch or locking device 54.

The oven loading mechanism

This mechanism, Fig. 1, may comprise a horizontal rotary table type conveyor 55 spanning the space between the oven and the dead plate 13 and supported at the same level at both the dead plate 13 and the floor of the entrance opening 31 to the oven chamber. The conveyor member 55 may be mounted upon an upright rotary support 56, only a portion of which is shown. Any suitable means may be provided for rotating the table 55 about the vertical axis of the support 56 at a speed and in a manner appropriate to permit such table to perform its function in combination with the other elements of the oven loading device. It is unnecessary to show any such means as the same can readily be provided by those skilled in the art.

Starting with a glass article, such as the bottle indicated at 57, standing upon the dead plate 13 in the position indicated in full lines in Fig. 1, a pusher 58 may be operated by any suitable known means, such, for example, as that disclosed in Ingle Patent 1,921,390 of August 8, 1933, to operate any of the pusher rods 22, Fig. 1, of that patent, to move such bottle from the dead plate 13 onto the adjacent portion of the table 55, as to the dot-and-dash position thereof. At this time, the immediately preceding bottle, indicated at 59, may have been moved by a rotary movement of the table 55 through 180° to a position directly at the front of the loading opening 31 of the oven. From this position, the bottle 59 may be pushed into the oven through the front opening 31 by a loading pusher 60.

The loading pusher 60 is carried by the rearwardly turned lower end portion of an arm 61 which depends from a cross head 62. The latter, see Fig. 2, has a pair of parallel sleeve portions 62a slidable upon parallel stationary guide rods 63. These may be supported at their rearward end portions upon the oven structure, as by brackets 64 and 65 on the supporting frame structure 65a. The guide rods 63 may be connected at their forward ends by a cross bar 66.

A pressure fluid motor 67, which also may be mounted on the frame structure 65a, has a forwardly projecting piston rod 68 connected at its forward end, as at 69, Figs. 2 and 3, to the cross head 62. The motor 67 is effective to reciprocate the cross head 62 and its depending arm 61 back and forth on the guide rods 63. The pusher 60 will thus be moved as required to push the bottle 59 from the table 55, Fig. 1, across a slide surface 70 at the bottom of the intake opening 31 of the oven chamber onto the adjacent end portion of the conveyor 23, and will thereafter be retracted to its initial position.

The reciprocable cross head 62 also carries the hereinbefore described door opening bar 49 so that the loading movement of the pusher 60 is attended by a similar movement of the door opening bar. In consequence, the projecting wedge-shaped end 50 of the door opening bar will be moved between the rollers 46 of the door opening mechanism, Figs. 2 and 3, so as to cam them apart and thus to open the doors inwardly in advance of the glass article that is being introduced into the oven chamber.

As shown in Fig. 9, the pressure fluid motor 67 is operatively connected at its opposite end portions by pressure fluid supply and exhaust pipes 71 and 72, respectively, with a solenoid valve 73. This valve is connected with a main pressure fluid supply pipe 74 and has an exhaust pipe or outlet 75 with which the pipes 71 and 72 are alternately placed in communication by the operation of the valve. The timer of the forming machine is represented diagrammatically at 76 and the shaft thereof, indicated at 77, drives a train of gears 78 which drive a shaft 79 of a speed reduction unit 80. The speed reduction unit 80 may be operatively connected with a differential or phase changing device 81. A driven shaft of the latter, indicated at 82, is shown as also being the drive shaft of a timer 83. This timer is operatively connected by the wires 84 with the solenoid valve 73 and by other wires 85 with lead wires 86. With this arrangement, the timer 83 will function to operate the solenoid valve 73 in a predetermined variable phase relation with any one of the operations which may be controlled by the forming machine timer 76. The forming machine may be of the Hartford I. S. type and the timer then may be of a type customarily used with that machine, an example of which is disclosed in Ingle Patent 1,911,119 of May 23, 1933. Any other suitable known forming machine and/or timer may be employed.

The operations of the forming machine takeout mechanism 12 may be controlled by the forming machine timer 76, and the operations of the loading pusher 60 thus may be timed to occur at times suitably related to the operations of the takeout mechanism 12. Provision thus may be made to assure the functioning of the glassware loading mechanism 11 as required to take to each article of glassware from the dead plate 13 promptly after its delivery there and to transfer it promptly to the conveyor 23 in the oven chamber. Assuming production of articles of glassware, such as the bottles shown, at regular intervals, the operations of the transfer mechanism 11 will effect substantially regular spacing of successive articles produced by the forming machine upon the oven conveyor substantially as shown in Fig. 1.

The pusher 58 may be timed from the forming machine timer as it is usual to provide such a pusher in a forming machine to push articles horizontally from one supporting surface to an adjacent surface.

It of course will be understood that many obvious variations in or modifications of the oven loading transfer mechanism may be made to meet particular service conditions or as individual preference may dictate.

The tempering mechanism

The article gripping and supporting mechanism hereinbefore referred to as comprising the tongs 14 will first be described. This mechanism includes an annular tongs head 87, Fig. 8, on which depending tong fingers 88 are pivoted, Figs. 1, 6 and 9. One of these tong fingers and its horizontal pivot pin 89, are shown to advantage in Fig. 8.

The tongs head 87 may be carried by vertically disposed tubes 90, Figs. 6, 8 and 9. As shown for one of the tubes 90 in Fig. 8, each of them may extend through a vertical bore or opening 91 in a stationary annular bearing member 92. The stationary annular bearing member 92 may be supported in a suitable vertical opening 93 in a stationary horizontal frame member 94. The latter may be of inverted channel shape and may be supported at a predetermined adjustable height above the oven structure, as on the upright posts 94a on the arched main supporting frames 94b, Fig. 1. An external flange 91a at the upper end of the bearing member 91 may be secured to the frame member 94, as by cap bolts such as that indicated at 95, Fig. 8.

The tubes 90 extend vertically through a higher annular bearing member 96, Figs. 1, 6, 8 and 9, each through a vertical opening in that bearing member as shown at 97 for one of the tubes 90 in Fig. 8. The bearing member 96 may be supported upon the frame member 94 and attached to the latter, as by cap bolts and supporting spacing tubes or sleeves such as those indicated at 98 and 99, respectively, in Fig. 8. The tubes 90 are connected at their upper ends to a bottom plate 100a of a hollow head frame 100, as by having their upper end portions clamped in vertical openings 101 provided in the bottom plate 100a, as by clamping devices 102 depending from such bottom plate as shown in Fig. 7.

The hollow frame 100 has a top plate 103 connected with and spaced from the plate 100a by cap bolts 104 and spacing sleeves 105, Fig. 7. The plate 103 may also constitute the bottom head of a vertically disposed air cylinder 106. The upper head 107 of this cylinder is provided with an upwardly projecting threaded attaching rod 108 adjustably attached to the outer end portion of a horizontal arm 109, Figs. 6, 7 and 9, as by extending through a vertical opening 110 in the arm 109 and being fastened to the arm by the upper and lower clamping nuts 111 and the lock nuts 112 as shown in Fig. 7.

A piston rod 113 projects downwardly from the cylinder 106 through the hollow head frame 100 and through the bore of a vertical stop sleeve 124 that is carried by and depends from the central portion of the plate 100a, Fig. 7. The piston rod 113 carries within the hollow frame 100a vertically movable cross head plate 114 to which the upper ends of rods 115 are secured. The rods 115 depend through the tubes 90 into the annular tongs head structure 87, Fig. 8. Here they are attached to a vertically movable tongs closing and opening member 116, as by threaded connections such as that indicated at 117, Fig. 8, for one of the rods 115. The member 116 may be guided in its vertical movements in the structure 87 by vertical guide bolts 118 which may also serve to attach the annular bottom member of the frame structure 87 to the top member of that structure.

Pivoted links, one of which is shown at 119, Fig. 8, operatively connect the vertically movable member 116 with the pivoted tong fingers 88, being pivotally attached to inwardly projecting portions of the tong fingers 88 at the upper ends of the latter, as indicated at 120 for the link and tong finger shown in Fig. 8.

The tong fingers 88 may carry article engaging members or jaws, such as the pointed screw indicated at 121, Fig. 8, as being threaded through a suitable threaded radial opening in the lower end portion of the tong finger 88. The extent of inward or closing movements of the tong fingers and hence of the members 121 may be adjusted by turning an adjusting nut 122 on the threaded lower end portion 123 of the piston rod 113 so as to vary the limit of the upward movement of the piston rod with respect to the lower end of the stop sleeve 124, Fig. 7. This is in addition to the individual adjustments of the screw members 121 relative to their supporting tong fingers. Thus, the tongs may be adjusted to grip articles of different transverse dimensions or cross-sectional area at the neck or other portions thereof that are to be gripped. This adjustment is useful to obviate too severe gripping of the neck of a glass article such, for example, as might cause checking thereof under certain conditions. The reverse or opening movements of the tongs will occur when the rods 115 are lowered or moved downwardly, as by a downward movement of the piston rod 113 relative to its cylinder 106. A washer, such as that indicated at 125, Fig. 7, may be placed around the portion of the piston rod 113 underneath the vertically movable member 114 to limit the downward throw of this member in the frame 100, whereby to limit the extent of opening movements of the tong fingers. Washers 125 of different thicknesses may be used selectively if desired.

The cylinder 106 may be provided at each of its opposite ends with a pressure fluid supply and exhaust pipe 126 or 127, for effecting reciprocation of the piston rod 113 to open and close the tongs. The timing of the reciprocatory movements of this piston rod and hence the opening and closing of the tongs may be effected by mechanism which will hereinafter be described.

The arm 109 may be carried by the upper head member 128 of a vertically disposed vertically reciprocable cylinder 129, Figs. 6, 7 and 9. A piston rod 130 depends from the cylinder 129 and is adjustably connected at its lower end portion by a turnbuckle 131 with the upper end portion of a piston rod 132 which projects upwardly from a vertically disposed stationary lower cylinder 133. The latter may be carried by a bracket 134 on a stationary supporting frame structure 135.

The upper vertically reciprocable cylinder 129 may be guided and stayed in its vertical movements by any suitable structure. A pair of upright rods 136, partially shown in Figs. 1 and 7, may be provided on the supporting frame structure of the apparatus so as to extend through suitable openings in laterally extending portions of the head plate 128 at the upper end of the vertically movable cylinder 129, Fig. 7. These rods 136 may be connected at their upper ends by a cross bar 137. This guiding and supporting structure may be further stabilized, if desired, by connecting it with the upright columns 138, Fig. 1, or with any other available stationary supporting structure.

The cylinder 129 is provided at its upper and lower end portions with combination pressure fluid supply and exhaust pipes, 139 and 140, respectively. The cylinder 133 may be provided with similar pipes 141 and 142 respectively connected with the upper and lower end portions thereof.

The path of vertical movements of the tongs as effected by the mechanism as just described may be adjusted vertically within limits by varying the place of connection of the arm 109 along the vertical attaching stem 108, Fig. 7. Adjustment of the turnbuckle 131 may be employed to vary the vertical path of movements of the tongs. These adjustments may be used to adapt the tempering mechanism for use with bottles and other glass articles of different heights and sizes. Either or both such adjustments may be used.

The tempering mechanism may include means for effecting relative rotation between the article of glassware being cooled and the blowing means. As shown in Fig. 8, a rotary blow head 143 of annular form is mounted anti-frictionally within a stationary outer annular bearing box 144. This bearing box may be carried by the frame member 94, being attached to the latter by suitable means, as at 145, Fig. 8. The annular blow head 143 is provided with vertical passages, one of which is shown at 146. These are in communication at their upper ends with an annular groove 147 at the outer periphery of the rotary member 143. The groove 147 is in communication with a cooling fluid supply pipe 149 that is carried by the stationary bearing box 144. The rotary blow head 143 is connected at its lower end with the annular upper head member 19a of the outer blowing frame 19 so that each passage 146 communicates with a passage 146a in the head member 19a, leading to the bore or internal passage of one of the external cooling fluid discharge nozzles 20.

An inner rotary blow head 150 is mounted within the stationary bearing member 92, as by a needle bearing assembly 151, and within the upper stationary bearing member 96, as by the anti-friction bearing arrangement indicated at 152. The bore 153 of the inner rotary blow head communicates at its lower end with the bore of the internal nozzle 18. The latter may be threadedly connected, as at 154, with the internal rotary blow head 150. The bore of this internal rotary blow head may communicate at its upper end with a passage 155 in a plug 156 which closes the upper portion of the annular stationary bearing 96. The passage 155 communicates with a cooling fluid supply pipe 157.

With the arrangements just described, cooling fluid may be supplied to the internal and external blowing nozzles of the tempering mechanism while such nozzles are being rotated around a vertical axis common to the internal nozzle, the series of external nozzles, and the article being cooled. The rotary inner blow head 150 may be rotated about its vertical axis through a train of gears 158 to which motion is imparted from a vertically disposed driven shaft 159. See Fig. 8. This shaft may be supported anti-frictionally, as at 160, upon a stationary supporting annular bearing member 161. The latter may be supported upon the stationary frame member 94. The lower end of the shaft 159 may carry a relatively large driving pinion 162 in mesh with a driven pinion 163 which is carried by the outer rotary blow head 143. Thus, rotation of the shaft 159 in one direction will cause rotation of the internal nozzle 18 about its vertical axis in one direction and rotation of the series of nozzle members 20 as a unit in a circle about the same axis in the same direction, preferably at the same angular velocity or in step with each other. The tongs may support the article being cooled, as the bottle 17 in Fig. 8, so that its axis coincides with this axis of rotation. A coupling 163a may be provided between the shaft 159 and the driving shaft of a motor unit 164. The latter may be mounted upon a bracket 165 carried by the supporting frame member 94. See Figs. 1, 6 and 9.

*The mechanism for operating the oven top door and for transferring tempered articles to the final delivery conveyor*

The top opening 16 of the oven may be covered by the horizontally slidable flat closure member or door 21 except when the tongs are to be lowered into the oven to pick up a glass article and until they have thereafter been raised from the oven. The opening 16 is completely unobstructed when the door 21 is in its retracted position, shown in dot-and-dash lines in Fig. 1. A pressure fluid cylinder 166 has its piston rod 167 operatively connected with an up-turned flange or handle 168 on the rearward edge portion of the horizontal door 21 for opening and closing the latter. The cylinder 166 may be supported above the level of the oven top, as upon the cross head portion 169 of an arched supporting block 170, the legs of which may rest upon and be fastened to the oven top, as by bolts 175, Fig. 1. Pressure fluid combination supply and exhaust pipes 171 and 172, respectively, may be connected with the opposite end portions of the pressure fluid cylinder 166 as best seen in Fig. 9. The up-turned flange or handle member 168 of the sliding horizontal door 21 may be additionally connected with the door by integral side webs or wing plates, such as that indicated at 173, Fig. 6.

A pressure fluid motor cylinder 174 may be attached firmly at one end to the flange or handle portion 168 of the door 21 so as to be moved rectilinearly with the latter between the full line and the dotted line positions shown in Fig. 1. An apertured lug 176 is carried by the cylinder 174 near its opposite or free end in sliding engagement with a guide rod 177 that is carried by the cylinder 166. A piston rod 178 projects from the attached end of the cylinder 174 and carries the hereinbefore mentioned pusher 25, by which a tempered bottle standing on the closure 21 may be shoved rearwardly therefrom onto the final delivery conveyor 26 as hereinbefore has been pointed out. The operation and the result thereof are indicated by the full line and the dot-and-dash line showings of the pusher 25 and of the bottle 22 in Fig. 1. Pressure fluid conducting pipes 179 and 180, respectively, may be connected with the opposite end portions of the cylinder 174, as best seen in Fig. 9.

*The photo-electric and other control mechanisms; their operations*

Figure 4:
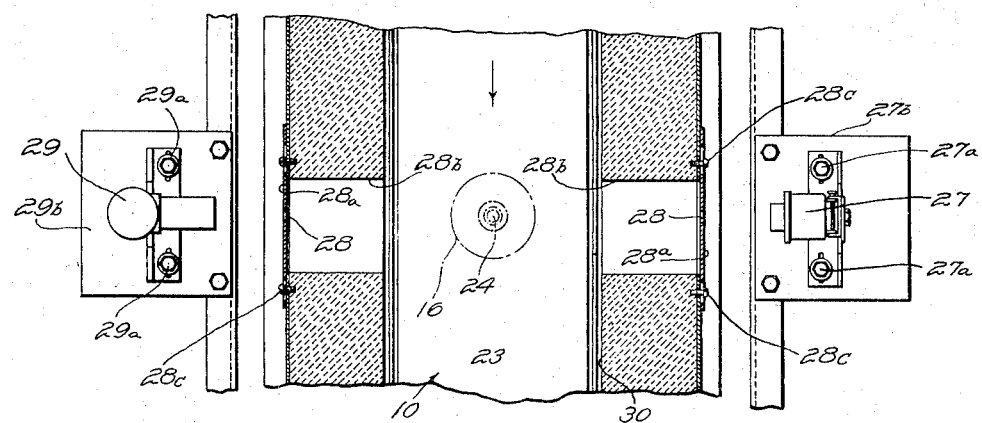
Fig. 4 is a fragmentary horizontal section of a portion of the glassware heating or temperature equalizing structure or oven, showing electric eye provisions thereof for controlling the operations of other parts of the apparatus, the view being substantially along the line 4—4 of Fig. 5.
Figure 5:
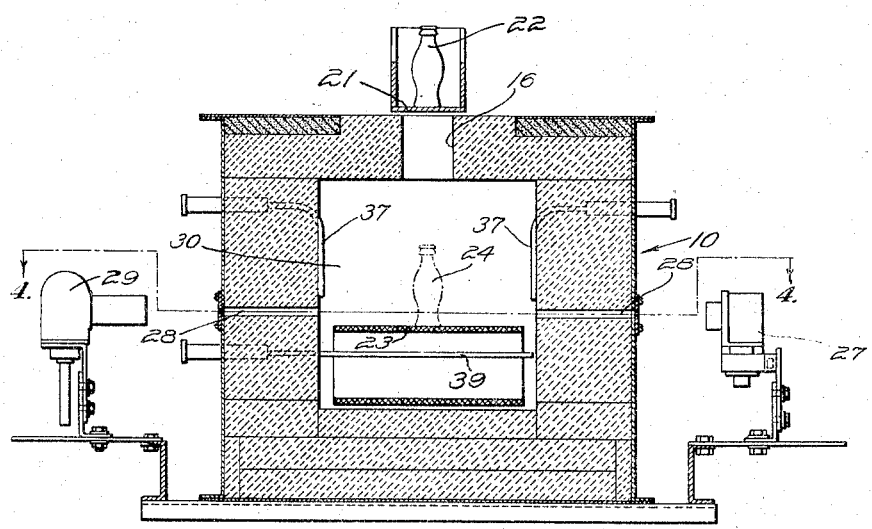
Fig. 5 is a transverse vertical section through the glassware heating or temperature equalizing structure or oven at the plane at which glassware may be removed therefrom through an opening in the top of the oven.

When a bottle on the conveyor 23 reaches its takeout position, as shown for the bottle 24 in Fig. 1, it will intercept light passing from the lamp 27 through the aligned slits 28 to the photo-electric device 29, Figs. 4 and 5.

The slits 28 may be small openings in plates 28a which cover the outer ends of much larger slots or elongate openings 28b which are formed in the refractory side walls of the oven. The plates 28a are adjustably attached at 28c to the oven side walls so that these plates may be slid along the side walls for limited distances and secured in various adjusted positions so as to vary in the direction of length of the oven chamber 30 the location of the transverse path of light between the slits 28 in the plates 28a. The lamp 27 and the photo-electric device 29 are adjustably fastened at 27a and 29a, respectively, on their supporting plates 27b and 29b, respectively, Fig. 4, so that they may be adjusted in the same direction as the plates 28a to line them up with each other and with the slits 28 when the latter are in any of their different adjusted positions. As a result, a bottle or other glass article may be subjected to a heating or temperature equalizing treatment for a slightly longer or slightly shorter time after such article has been placed on the conveyor 23 before such article reaches its takeout position, according to whether the adjustments of the plates 28a, the lamp 27, and the photo-electric device 29 are away from or toward the loading end of the oven and assuming that no change has been made in the speed of the conveyor.

The photo-electric device 29 will act through the wires 181, Fig. 9, to actuate an electrical amplifying device 182. The latter is connected by wires 183 with the electric lead wires 86 and by wires 184 with a relay mechanism 185 for starting a motor 186. The motor operating circuit may comprise three-phase current supply wires 187 connected with the relay mechanism 185 and cooperative wires 188 connecting the relay mechanism 185 with the motor. When the relay mechanism 185 is actuated by the closing of a circuit including the amplifying mechanism 182 and the wires 184, the motor 186 will be started. The motor 186 will act through driving connections indicated at 189 to drive a shaft 190. This shaft may operate a reset switch 191 which is connected with the relay mechanism by wires 192. The arrangement is such that the reset switch does not actuate the relay mechanism 185 during the initial period of operation of the motor 186 but does so only after the motor has been temporarily stopped and has again resumed operation in a complete cycle of operations of the tempering mechanism, as hereinafter will be more fully explained. The shaft 190 may also impart motion through a suitable differential or phase adjusting mechanism 194 to a driven shaft 195 and a series of connected motion transmitting devices indicated at 196 for driving the shaft of the main tempering machine timer 197.

The timer 197 controls wires 198 leading to a solenoid valve 199 which controls the pressure fluid supply and exhaust pipes of the cylinder 166 for opening and closing the oven top door 21. The timer 197 also controls a circuit comprising wires 200 connecting such timer with a solenoid valve mechanism 201 which in turn controls the pipes 179 and 180 leading to the opposite ends of the cylinder 174 for operating the pusher 25. The timer 197 also controls wires 202 leading to a solenoid valve 203. The valve 203 is operatively connected by pressure fluid supply and exhaust pipes 142 and 141, respectively, with the opposite ends of the cylinder 133 of the glassware raising and lowering means of the tempering device. Wires 204 lead from the timer to a solenoid valve 205 which controls the pipes 140 and 139 of the pressure fluid cylinder 129. This cylinder, as previously stated, also is included in the glassware raising and lowering means. The downward stroke of the cylinder 129 relative to its piston may be timed to occur in advance of the downward stroke of the piston in the cylinder 133. See Fig. 6. The return or upward strokes of both the cylinder 129 and the piston in the cylinder 133 may occur simultaneously. Another set of wires 206 lead from the timer 197 to a solenoid valve 207 which controls the pipes 127 and 126 leading to the cylinder 106 of the tongs opening and closing mechanism.

When the conveyor 23 in the oven brings an article, such as the bottle 24, to the article takeout position, the consequent energization of the photo-electric device 29 will cause a series of operations of the connected electrical and pneumatic controlling and operating parts just described. This series of operations may be said to commence with an opening of the door 21 to permit the tongs to be lowered to their pick-up position, closing of the tongs to grip the article 24, raising of the tongs to lift the article supported thereby to the cooling station, the closing of the door 21, pushing by the pusher 25 of the previously tempered bottle from the door 21 onto the final delivery conveyor 26, and retraction of the pusher 25.

During the upward movement of the cylinder 129 in the operation of raising the article to be tempered to its cooling or tempering station, an actuator 208 on the cylinder 129 will strike a movable control member 209 of a switch 210 and close the latter so as to complete a circuit which includes wires 211 connecting the switch 210 with the relay mechanism 185. The latter will thereby be acted upon suitably to open the motor operating circuit so that the motor will be stopped. When the cylinder 129 reaches the upper limit of its operating stroke, the arm 109 that has been moved therewith will strike and operate the operating handle 212 of a switch 213. This switch is connected by electrical input wires 214 with the leads 86 and by electrical output wires 215 with a solenoid valve 216 and by branches 217 of the output wires 215 with a second solenoid valve 218. These solenoid valves control the supply of cooling fluid to and through the pipes 149 and 157, respectively. As hereinbefore has been pointed out, the pipe 157 delivers cooling fluid to the internal nozzle and the pipe 149 delivers cooling fluid to the nozzles or applicators of the external blowing frame. Blowing of the cooling fluid against the internal and external surfaces of the article when the latter is at its raised position may take place while the motor 186 is idle. However, the arm 109, in moving to its raised position, has also actuated the controlling arm or operating handle 219 of a switch 220 which is connected by wires 221 with an auxiliary timer 193 for regulably controlling the length of the blowing period while the motor is idle. The auxiliary timer is connected at its input side by wires 222 with the lead wires 86 and at its opposite side by wires 223 with the main motor control relay switch 185.

After a predetermined period for the blowing of cooling fluid onto the article to be tempered, the auxiliary timer 193 will act upon the relay mechanism 185 to restore the motor operating circuit and thus will re-start the motor 186 for the second stage of operations of the tempering machine. The operations performed during this second stage comprise downward movement of the tongs and of the article gripped thereby from the cooling station to the article releasing position above the closed oven top door 21, opening of the tongs to allow the article to rest upon this closed door, as in the position of the article 22 in Figs. 1 and 9, opening of the door 21 and further downward movement of the tongs to position to pick up the next article at the article takeout station in the oven. This second stage of operations may be terminated as a result of actuation of the relay mechanism 185 by the motor driven reset switch 191 so as to open the motor operating circuit and to reset the relay mechanism for actuation by the photo-electric device at the proper time to start the next cycle of operations.

Electric switches may be provided wherever they are deemed to be desirable or necessary so that operations may be stopped or manually controlled. As shown, a switch 224 is provided for the leads 86 and another switch 225 is provided for the three-phase wires 187. Further similar or other known switches may be provided at appropriate places for throwing individual electrically operated components of the apparatus out of operation separately if desired.

The solenoid valves are all operatively connected with the main pressure fluid supply line 74, either directly or by suitable branches of such supply line.

*Safety provisions of the glassware handling and tempering apparatus*

A hydraulic interlock may be provided according to our invention between the mechanism for raising and lowering the tongs and the mechanism for opening and closing the door 21 for the oven top opening. Referring to Fig. 6, the arm 109 at the top of the vertically movable cylinder 129 may have an extension 226 from which depends a bracket 227 to which a locking bar 228 is pivotally attached at its upper end. The bar 228 is reduced in width intermediate its length so that while one longitudinal edge thereof is straight for the full length of the bar the opposite edge thereof comprises two laterally spaced or disaligned straight portions 228a and 228b, respectively, and an intermediate inclined or cam portion 229. A roller 230 on the projecting end of a movable plunger 231 rides against this latter edge of the bar 228 so as to maintain the opposite, straight edge of the bar 228 against the web of a substantially U-shaped keeper 232. The bar 228 extends vertically between the legs of this keeper. These legs, one of which is indicated at 233, Fig. 6, may be connected integrally or otherwise with a cylinder 234 from which the plunger 231 projects. A piston 235 by which the plunger 231 is carried, is mounted for reciprocation axially in the cylinder 234 toward and away from the bar 228. A suitable liquid, such as oil, is supplied to the interior of the cylinder 234 at the end of the latter opposite the bar 228 and against the piston 235, as from a pipe 236. The pipe 236 is connected with a vertical pipe 237 which communicates at its upper end with the interior of a supply chamber 238 containing a feed body of the liquid used in the inter-lock mechanism. A downwardly opening check valve 239 may be provided in the line 237.

The line 237 is connected at its lower end with the upper end of a cylinder 240 in which is mounted a piston 241 carrying a downwardly projecting plunger 242. The plunger 242 has a roller 243 at its lower end riding upon the upper edge of a horizontal bar 244. The bar 244 is carried by a bracket 245 on the upwardly projecting operating flange or handle member 168 of the door 21. The arrangement is such that the bar 244 is rigidly connected with the door 21 so as to move rectilinearly as the door is moved between its open and closed positions. The bar 244 is partially cut away at its upper edge at 244a intermediate its length so that oppositely inclined cam surfaces 246 and 247, respectively, are provided at the opposite edge of the relatively low cut-away portion of the bar.

Liquid from the supply chamber 238 will fill the lines 237 and 236 and the available portions of the internal chambers of the cylinders 234 and 240 back of the pistons 235 and 241 in these cylinders. The arrangement is such that when the door 21 is closed, as shown in Fig. 6, the roller 243 will be on a high portion of the contact edge of the bar 244 and the roller 230 will be in contact with the edge 228a of the narrow lower end portion of the bar 228. The tongs 14 are now at their intermediate or tempered article set-down position. They are positively locked against downward movement from this position until the door 21 has been retracted for the reason that the wider upper portion of the bar 228 cannot be moved downward between the web of the keeper 232 and the roller 230 on the plunger 231 until the locking bar 244 has been moved by retraction of the door 21 so that the recess or cut-away portion 244a of such bar is directly under the roller 243.

Conversely, the door 21 cannot be moved from its retracted position to position to close the opening 16 until the tongs mechanism has been raised from the oven, thereby moving the bar 228 so that the roller 230 rides off the edge 228b of the wider upper portion of the bar 228 and then may be moved by the plunger 231 against the edge 228a of the narrower lower portion thereof. Accidental failure of pressure in the lines of the pneumatic means for operating one of these parts of the apparatus while the operation of the other part is unaffected might result in the first part remaining too long in a position that would cause damage to itself or the other moving part of the apparatus should the operation of the latter take place at the normal time. The hydraulic interlock prevents the normal operation of the second part until normal operation of the first part has been restored.

A manually operable plunger or false top 238a may be provided for the chamber 238 to assure complete filling of the connections between the cylinders 234 and 240 at all times. The liquid in this chamber and filling such connections may gradually be diminished by evaporation or leakage past the pistons 235 and 241. As shown, leakage return lines 248 and 249 connect the cylinders 234 and 240 with a pump chamber 250, a suitable check valve 251 being provided in the line 249 adjacent to the pump. The bar 244 may be arranged to actuate the plunger 252 of the pump 250 so as to force any liquid accumulating in the pump chamber through a delivery line 253 to an open-topped reserve chamber 254. An outwardly opening check valve 255 may be provided in line 253. A gravity flow connecting line 256, controlled by a normally closed valve 257, may be provided between the reserve chamber 254 and the feed chamber 238.

Our apparatus also may include a safety device for preventing downward movement of the tongs from their uppermost position should the pusher 25 remain in its projected position beyond the period intended. To this end, a rectilinearly movable rod 258 for controlling a switch 259, Figs. 1, 6 and 9, is connected at one end with the pusher 25 to move with the latter. The switch 259 is connected by wires 260 with separated ends of one of the wires 202. These hereinbefore have been pointed out as controlling the operation of the solenoid valve 203 which in turn controls the operation of the cylinder 133 of the mechanism for raising and lowering the tongs. When the pusher 25 is in its retracted position, the free end of the rod 258 is in position to keep the switch 259 closed so that the circuit for operating the solenoid valve 203 can be established by the timer 197. However, when the pusher is in its projected position, as shown in dot-and-dash lines in Fig. 6, the rod 258 has been moved rectilinearly away from the switch 259 so that the latter now stands open. Consequently the circuit for operating the solenoid valve 203 cannot be closed by the timer 197 alone or until the pusher 25 and the rod 258 have been retracted and the latter has again closed the safety switch 259.

Apparatus of our invention obviously may be used to handle and temper glassware other than that newly produced by an associate forming machine, as, for example, to increase the strength and durability of glassware that already has been heat treated by annealing and is cold at the time it is loaded into the heating or temperature equalizing oven. Also, the various components of the apparatus and the operations thereof may be varied from those shown in the accompanying drawings and herein described in many ways which will now be obvious to those skilled in the art. Some of these components may be used independently of the others or in combinations different from those herein described.

We claim:

1. In glassware handling and tempering apparatus, an oven having a glassware intake opening at one end thereof and a glassware removal opening at the top of the oven at a substantial distance from the intake opening, said oven being closed at its top between said intake opening and said ware removal opening, a conveyor within the oven for moving articles of glassware from a position therein adjacent to the intake opening to a takeout position beneath said glassware removal opening, means for periodically moving articles of glassware through said intake opening onto said conveyor, article pick-up means reciprocable vertically through said glassware removal opening between a cooling station located above said glassware removal opening and said article takeout position periodically to remove articles of glassware from said takeout position in said oven to said cooling station, means for cooling said glassware at said cooling station, a movable door for closing said glassware removal opening in the intervals between the movements through such opening of the means for removing glassware from the oven to minimize loss of heat from the oven through said opening, and means for opening and closing said door in predetermined timed relations with the vertical movements of the means for removing articles of glassware from the oven and independently of such means.

2. In an apparatus for handling and tempering glassware, an oven structure having a longitudinally extending chamber provided with a glassware intake opening at one end and with a glassware removal opening at its top adjacent to its opposite end, means for moving glassware within said chamber from a position adjacent to said intake opening to a glassware takeout position beneath said removal opening, said oven structure having slits at its opposite sides in transverse alignment with each other on a line extending across said takeout position, glassware tempering mechanism including glassware engaging means moving vertically between a higher glassware cooling station above the removal opening and said takeout position within the oven chamber periodically to remove articles of glassware from the oven chamber to said cooling station and means for cooling such glassware at said cooling station, and means for timing the operations of said tempering mechanism in relation to the time of arrival of each article of glassware at said takeout position in said oven chamber, said last-named means including a source of light at the outer side of one of said slits, a photo-electric device at the outer side of the other of said slits, and operating connections between said photo-electric device and said tempering mechanism constructed and arranged to be actuated by the photo-electric device when an article of glassware arrives at said article takeout position between said slits to initiate a cycle of operations of the tempering mechanism.

3. In glassware handling and tempering apparatus, an oven having a heat confining chamber therein provided with spaced glassware intake and glassware removal openings, a conveyor for transporting articles of glassware in said chamber from a place near the intake opening to a place adjacent to the removal opening of said chamber, said oven having elongate apertures in its side walls in transverse alignment with each other at opposite sides of the path of movement of glassware on said conveyor, plates adjustably mounted on the side walls of said oven in positions to cover the outer ends of said elongate apertures, said plates being provided with relatively small openings in alignment with each other transversely of the oven chamber, a photoelectric device adjustably mounted at one side of said oven in operative relation to the relatively small opening in the adjacent plate, a light-emitting device adjustably mounted at the opposite side of said oven for directing rays of light through the aligned relatively small openings to the photo-electric device, and means controlled by said photo-electric device and operated automatically whenever an article of glassware on said conveyor obstructs passage of light from the light-emitting device to the photo-electric device to remove said article from said oven through the ware removal opening thereof to an adjacent glassware cooling station.

4. In glassware handling and tempering apparatus, a heat confining chamber for glassware, said chamber having a glassware removal opening at its top and being otherwise closed at its top, a slidable door for said opening, automatic means for periodically opening and periodically closing said door, tongs for engaging and moving glassware, automatic means for reciprocating said tongs vertically between a glassware cooling station located above said glassware removal opening and a glassware takeout station located in said chamber beneath said glassware withdrawal opening, means for cooling glassware at said cooling station, and means for timing the operations of the automatic means for opening and closing said door and of the automatic means for reciprocating said tongs to cause opening of said door in advance of each downward movement of the tongs through said glassware removal opening.

5. In glassware handling and tempering apparatus, a heat confining chamber for glassware, said chamber having a glassware removal opening, a movable closure for said opening, means for reciprocating said closure between positions to open and close said glassware removal opening, respectively, tongs for engaging and moving glassware, means for reciprocating said tongs along a path extending through said glassware removal opening between a glassware cooling station outside of said chamber and a glassware takeout station located in said chamber, means for cooling glassware at said cooling station, and means for timing the operations of the means for reciprocating said closure and of the means for reciprocating said tongs to cause regularly recurring opening movements of said closure and of the tongs through said glassware removal opening to said takeout station in a predetermined phase relation with each other and a safety device effective to prevent such a regularly timed movement of said tongs into contact with said closure should said closure remain in its closed position beyond the time at which it normally would be opened.

6. In glassware handling and tempering apparatus, a heat confining chamber for glassware, said chamber having a glassware removal opening, a movable closure for said opening, means for reciprocating said closure between positions to open and close said glassware removal opening, respectively, tongs for engaging and moving glassware, means for reciprocating said tongs along a path extending through said glassware removal opening between a glassware cooling station located outside of said chamber and a glassware takeout station located in said chamber, means for cooling glassware at said cooling station, and means for timing the operations of the means for reciprocating said closure and of the means for reciprocating said tongs to cause regular cycles of movements thereof in predetermined phase relation with each other, and safety means acting automatically to retain said closure in its open position on failure of the means for reciprocating the tongs to move said tongs out of the path of closing movement of the closure.

7. In glassware handling and tempering apparatus, a heat confining chamber for glassware, said chamber having a glassware removal opening, a movable closure for said opening, means for reciprocating said closure between positions to open and close said glassware removal opening, respectively, tongs for engaging and moving glassware, means for reciprocating said tongs along a path extending through said glassware removal opening between a glassware cooling station located outside of said chamber and a glassware takeout station located in said chamber, means for cooling glassware at said cooling station, means for timing the operations of the means for reciprocating said closure and of the means for reciprocating said tongs, and a hydraulic interlock between the means for reciprocating the closure and the means for reciprocating the tongs effective to prevent operating movement of either of the tongs or the closure into contact with the other on failure of regularly timed operation of either by its operating means.

8. In glassware handling and tempering apparatus, an oven having the glassware intake opening at one end and a glassware removal opening at its top at a substantial distance from the intake opening, means for moving glassware in the oven from a position near the intake opening to a takeout position beneath said top opening, glassware tongs, means for reciprocating said tongs vertically between a glassware cooling station located above said glass removal opening and said glassware takeout station, a substantially flat movable closure for the glassware removal opening, means for reciprocating said closure horizontally between an open position at one side of said glassware removal opening and a closed position over said glass removal opening, and means for timing the operations of the respective means for reciprocating said closure and said tongs in relation to each other to cause said tongs to move downwardly to a position to deliver glassware onto said closure when the latter is in its closed position, a retractive movement of the closure to its open position during a dwell of the tongs at its said delivery position, further downward movement of the tongs through the open removal opening to the article takeout station, an upward movement of the tongs from said takeout station through said removal opening to said cooling station and a return movement of said closure to its closed position.

9. In glassware handling and tempering apparatus, an oven having a glassware removal opening at its top, glassware tongs, means for reciprocating said tongs vertically between a glassware cooling station located above said glass removal opening and a glassware takeout station in said oven, a movable closure for the glassware removal opening, said closure having a substantially flat upper surface, means for reciprocating said closure horizontally between an open position at one side of said glassware removal opening and a closed position over said glass removal opening, means for timing the operations of the respective means for reciprocating said closure and said tongs in relation to each other to cause said tongs to move downwardly from the cooling station to a glassware delivery position above said closure when the latter is in its closed position, a movement of the closure to its open position during a dwell of the tongs at its said delivery position, a further downward movement of the tongs through the open glassware removal opening to the article takeout position, an upward movement of the tongs from said takeout station through said removal opening to said cooling station and a return movement of said closure to its closed position, a conveyor located adjacent to said closure when the latter is in its closed position, a pusher, means for mounting said pusher for bodily movements with said closure and for independent movements toward and away from said conveyor, and means for moving said pusher relative to said closure to push an article of glassware from said closure onto said conveyor when said closure is in its closed position.

10. The combination of claim 9, together with a safety device effective to prevent a regularly timed downward movement of said tongs from said cooling station toward said glassware removal opening should the means for reciprocating the pusher fail to ecect timely movement of the latter out of the path of downward movement of the tongs.

11. The combination of claim 9, together with a safety device effective to prevent a regularly timed downward movement of said tongs from said cooling station toward said glassware removal opening should the means for reciprocating the pusher fail to effect timely movement of the latter out of the path of downward movement of the tongs, said safety device comprising a switch carried by the means for reciprocating the pusher and operatively connected with the means for reciprocating the tongs and a switch operating member carried by said pusher and effective to open the switch when said pusher is in position to project into the path of downward movement of said tongs.

12. In glassware handling and tempering apparatus, tongs comprising a plurality of relatively movable members closable to grip an article of glassware by its upper end portion and openable to release the article of glassware, a vertically movable carrier, means suspending said tongs from said carrier and means for reciprocating the carrier vertically to impart to the tongs cycles of movements, each comprising an upward movement of the tongs from an article pick-up station to a higher cooling station, a downward movement of the tongs to a delivery station intermediate the cooling station and the article pick-up station, and a further downward movement of the tongs from the delivery station to the pick-up station.

13. In glassware handling and tempering apparatus, tongs comprising a plurality of relatively movable members closable to grip an article of glassware by its upper end portion and openable to release the article of glassware, a vertically movable carrier, means suspending said tongs from said carrier and means for reciprocating the carrier vertically to impart to the tongs cycles of movements, each comprising an upward movement of the tongs from an article pick-up station to a higher cooling station, a downward movement of the tongs to a delivery station intermediate the cooling station and the article pick-up station, and a further downward movement of the tongs from the delivery station to the pick-up station, means for closing the movable members of said tongs to grip an article of glassware at said pick-up station and to support said article thereafter while the tongs are at said cooling station and until said tongs have been moved downwardly from the cooling station to said delivery station and for opening said movable members at said delivery station to release there the article previously gripped by the tongs, and means for discharging cooling fluid against the internal and external surfaces of each article of glassware brought to the cooling station by said tongs while said article is supported at said cooling station by said tongs.

14. In apparatus for handling and tempering glassware, tongs, means for mounting said tongs for vertical reciprocatory movements between a lower article pick-up station and a higher cooling station, means for reciprocating said tongs between said stations, means for delivering articles of glassware periodically to said pick-up position, means for operating said tongs to cause them to grip each such article when the tongs are at the pick-up station and to support said article so that it will be moved by said tongs to said cooling station, means for blowing cooling fluid against each article of glassware brought by said tongs to the cooling station, control mechanism comprising means for timing the operations of the means for reciprocating the tongs and of the means for blowing cooling fluid against said articles of glassware in relation to one another and to the time of arrival of each article of glassware at said pick-up station, and means for controlling the duration of the period of blowing of cooling fluid against the glassware at said cooling station.

15. In glassware handling and tempering apparatus, tongs for an article of glassware, means for mounting the tongs for reciprocation vertically between a lower glassware pick-up position and a higher glassware cooling station, means for reciprocating said tongs between said pick-up position and said cooling station, means for operating said tongs to cause them to grip said article of glassware at said pick-up position so as to support said article when the tongs are moved to said cooling station, means for cooling the glassware supported by said tongs at said cooling station, and means for adjusting the means for mounting said tongs to vary the vertical reciprocatory movements of said tongs.

16. In glassware handling and tempering apparatus, tongs for an article of glassware, means for mounting the tongs for reciprocation vertically between a lower glassware pick-up position and a higher glassware cooling station, means for reciprocating said tongs between said pick-up position and said cooling station, means for operating said tongs to cause them to grip said article of glassware at said pick-up position so as to support said article when the tongs are moved to said cooling station, means for cooling the glassware supported by said tongs at said cooling station, and means for adjusting the means for mounting said tongs to shift vertically the path of the vertical reciprocatory movements of said tongs.

17. In glassware handling and tempering apparatus, tongs comprising a head, a plurality of depending fingers pivotally attached at their upper portions to said head, article engaging elements adjustably carried by the lower end portions of said fingers, a vertically movable carrier, vertical tubes suspending said head from said carrier, an air motor carried by said carrier, vertical rods extending slidably through said tubes, vertically movable means pivotally connecting the lower ends of said rods with said fingers for operating them to open and close the article engaging elements carried thereby, and means operatively connecting the upper ends of said rods with said air motor.

18. In a glassware handling and tempering apparatus, a plurality of independently mounted reciprocable members, air motors operatively connected with said members for reciprocating them, solenoid valves operatively connected with said air motors and with a source of supply of air under pressure for controlling the operations of said air motors, a timer operatively connected with said solenoid valves for operating them in a predetermined sequence, a motor connected with said timer to operate it, electrical means including a photo-electric device and rendered effective by the interception of light directed toward said photo-electric device by an article of glassware at a predetermined station to start said motor, means for presenting articles of glassware periodically at said station, and means acting automatically to stop said motor on completion of each complete cycle of operations of said timer.

19. In glassware handling and tempering apparatus, an oven having spaced glassware intake and glassware removal openings, a conveyor in said oven for conveying an article of glassware from a receiving position adjacent to said intake opening to an article removal position adjacent to said removal opening, means for moving the conveyor continuously, a transfer mechanism for transferring each article of glassware brought to said article removal position to a glassware cooling station outside of said oven, and means, including a photo-electric cell located in position to be affected by obstruction of light thereto by an article of glassware in a predetermined position on the conveyor in said oven, to operate said transfer mechanism so as to synchronize the operations thereof with the arrival of articles of glassware on said conveyor at said article removal position.

20. In glassware handling and tempering apparatus, a substantially horizontal conveyor for conveying articles of glassware through a heated atmosphere successively from an article receiving position to an article removal position, means for moving the conveyor continuously, independently driven transfer means for transferring to an adjacent cooling station successive articles of glassware brought by said conveyor to said article removal position, and means, including a photo-electric cell positioned operatively in respect to the path of movement of glassware carried by said conveyor and operatively connected to said transfer means, to synchronize the operations of the latter with arrival at said article removal position of the articles of glassware on said conveyor.

CHARLES E. MONGAN, Jr.
DONALD W. MUELLER.

REFERENCES CITED

The following references are of record in the file of this patent:

UNITED STATES PATENTS

| Number | Name | Date |
|---|---|---|
| 1,654,710 | Tucker et al. | Jan. 3, 1928 |
| 1,869,920 | Soubier | Aug. 2, 1932 |
| 2,004,492 | McNamara et al. | June 11, 1935 |
| 2,066,283 | Wadman | Dec. 29, 1936 |
| 2,170,749 | Forbes | Aug. 22, 1939 |
| 2,180,737 | Hess | Nov. 21, 1939 |
| 2,188,401 | Crowley | Jan. 30, 1940 |
| 2,194,612 | Paddock | Mar. 26, 1940 |
| 2,198,749 | Weber | Apr. 30, 1940 |
| 2,259,741 | Drake | Oct. 21, 1941 |
| 2,265,308 | Perry et al. | Dec. 9, 1941 |
| 2,269,060 | Mitford | Jan. 6, 1942 |
| 2,275,155 | Mongan | Mar. 3, 1942 |
| 2,294,274 | Buxbaum | Aug. 25, 1942 |
| 2,309,290 | Aksomitas | Jan. 26, 1943 |
| 2,338,071 | Mongan | Dec. 28, 1943 |
| 2,370,381 | Vaughn | Feb. 27, 1945 |

FOREIGN PATENTS

| Number | Country | Date |
|---|---|---|
| 477,414 | Great Britain | Dec. 30, 1937 |

OTHER REFERENCES

Ser. No. 314,727, Quentin (A. P. C.), published April 27, 1943.